3,316,183
SHAPED CARBON ARTICLES AND METHOD OF MAKING
Laurence F. King, Mooretown, Ontario, and Warren D. Robertson and Clellie Truman Steele, Sarnia, Ontario, Canada, assignors to Esso Research and Engineering Company, a corporation of Delaware
No Drawing. Filed Dec. 12, 1963, Ser. No. 329,994
9 Claims. (Cl. 252—510)

This invention relates to the manufacture of shaped carbon articles such as briquettes, electrodes, brushes and internal linings of electric furnaces and electrolytic cells and more particularly to the manufacture of Soderberg or self-baking electrodes for use in the electrolytic production of aluminum.

Shaped carbon articles such as electrodes have been prepared by mixing crushed, calcined coke with a binder such as coal tar pitch or other bituminous tar or pitch followed by molding or extruding to the desired shape and finally baking the resultant shaped mixture in order to carbonize the binder material and impart the necessary physical and electrical properties to said articles. In electrode manufacture it has been found that the nature and the quality of the binder used is extremely critical.

It has been the usual practice to utilize, almost exclusively, coal tar pitch, the dark brown to black amorphous residue left after coal tar is redistilled, as the thermoplastic binder in the manufacture of such shaped carbon articles especially carbon electrodes. Considerable effort has been directed to the preparation of petroleum pitches for use as binders in electrode manufacture. These efforts have not been particularly successful either because of the high contaminant content of the petroleum pitches or poor coke yields often due to excessive cracking and subsequent loss by volatilization therefrom. A further marked disadvantage of petroleum pitches has been their tendency to flow or bleed from the electrode composition during the prebaking or baking of the electrode leaving areas of unbonded coke or carbon in the finished electrode. This results in uneven or inadequate mechanical strength and also non-uniform electrical conductivity of the resultant electrodes.

It has now been found that petroleum tars and pitches which are incapable of producing satisfactory electrodes or other shaped carbon articles principally because of their tendency to bleed from the green mix or coke particle-pitch binder composition during baking thereof can be utilized to form shaped carbon articles having excellent physical and electrical characteristics provided that there is included a relatively small, critical amount of certain carbon blacks. The term "carbon black" covers a wide variety of finely divided carbon particles made by the incomplete combustion or thermal decomposition of natural gas or liquid hydrocarbons. The properties of carbon blacks are dependent upon the particular method used for their preparation as well as upon the hydrocarbon material used as the source of the carbon.

The carbon blacks which have been found to be suitable for upgrading petroleum pitches to a point where they can be used effectively as binder material in the manufacture of electrodes, particularly the continuous or Soderberg type, as well as other shaped carbon articles are the so-called "reinforcing" or "semi-reinforcing" carbon blacks. The carbon blacks which are suitable for the purposes of the present invention are those of small average particle size, i.e., smaller than about 100 m$\mu$, usually 15–100 m$\mu$ preferably about 20–80 m$\mu$ average particle diameter and, in addition, have an appreciable pore structure, i.e. a surface area of at least 15 sq. meters per gram, preferably about 20 to about 250 sq. meters per gram.

A number of commercially available carbon blacks which are suitable for the purposes of this invention and their surface area and particle size characteristics are as follows:

| Product | Type [1] | Supplier | Ave. Particle Size,[2] m$\mu$ | Surface Area,[2] M.$^2$/g. |
|---|---|---|---|---|
| Vulcan 6 | ISAF | G. L. Cabot, Inc. | 23 | 115 |
| Sterling 99 | FF | do | 56 | 61 |
| Sterling V | GPF | do | 53 | 27 |
| Regal SRF | SRF | do | 80 | 23 |
| Continental A | MPC | Continental Carbon Co., Witco Chemical Co. Inc. | 24 | 110 |
| Continental R-40 | CC | do | 25 | 150 |
| Continex CF | CF | do | 23 | 125 |
| Continex HMF | HMF | do | 65 | 37 |
| Standard Micronex | MPC | Columbian Carbon Co. | 24 | 115 |
| Statex M | FEF | do | 41 | 42 |
| Statex G | GPF | do | 60 | 37 |
| Neotex 100 | | do | 25 | 107 |
| Kosmobile 77 | EPC | United Carbon Co., Inc. | 30 | 105 |
| Kosmos 20 | SRF | do | 80 | 23 |
| Kosmos 60 | HAF | do | 29 | 74 |
| Shawinigan Black | CF | Shawinigan Chemicals, Ltd. | 42 | 67 |

[1] Type:
  CF = Conductive Furnace Black
  FF = Fine Furnace Black
  SRF = Semi Reinforcing Furnace Black
  GPF = General Purpose Furnace Black
  MPC = Medium Processing Channel Black
  CC = Conductive Channel Black
  EPC = Easy Processing Channel Black
  HMF = High Modulus Natural Gas Furnace Black
  FEF = Fast Extruding Furnace Black
  HAF = High Abrasion Furnace Black
  ISAF = Intermediate Super Abrasion Furnace Black.
[2] Figures given for particle size and surface area are representative values and not specifications.

The foregoing carbon blacks are added to the petroleum pitch binders in relatively small amounts of up to about 10 wt. percent usually about 2 to 8 wt. percent and preferably about 2.5 to 5.0 wt. percent based upon the petroleum pitch, or 1.0 to 2.0 wt. percent based on the coke used. These amounts of carbon black are in sharp contrast to the large amounts of thermal carbon black that have been added as a filler or replacement for a substantial part, i.e., about 10 to 40 wt. percent of the coke used for making electrodes as shown, for example, in U.S. Patents 2,527,595 and 2,761,848. The carbon blacks used in accordance with the present invention, either because of their small particle size or their surface area characteristics (or both) in the small quantities used act more in the nature of a catalyst which, during the baking cycle initiates, by polymerization, condensation and dehydrogenation, the formation of high molecular weight resins (benezene and quinoline insolubles) of such a kind that a thermally stable physical system is formed (no bleeding of oil) and this leads to a dense graphitic structure on baking. Thermal blacks, i.e. carbon blacks, having average particle size of from about 175 to about 500 m$\mu$ and surface areas below about 15 m.$^2$/gm. are relatively ineffective in increasing compressive strength of the electrodes or decreasing oil bleeding tendencies, certainly when used in economically feasible amounts. Increasing the quantity of carbon black added beyond about 5 wt. percent based upon the pitch binder does not usually effect a further increase in compressive strength. Moreover, addition of more than about 5 wt. percent carbon black, particularly the smaller average particle size and larger surface area types, has a tendency to decrease high temperature flow which is generally undesirable.

The particle size indicated for the above-mentioned reinforcing and semi-reinforcing carbon blacks is for the fluffy material as originally produced. In view of the difficulties in handling and dispersing this finely divided material, it is ordinarily preferable to utilize these carbon blacks in pelletized form. In order to obtain adequate dispersion of the pelletized blacks, it is necessary to pass them through a colloid mill with a suitable liquid vehicle to form a 15 to 25 wt. percent concentration of carbon black particles. The liquid vehicle should have at least 35 SUS viscosity at 210° F. and is preferably an aromatic light distillate boiling in the range of from about 525 to about 900° F. of 35–40 SUS viscosity at 210° F. and should have at most 5 wt. percent of asphaltenes and at most 0.05 wt. percent ash content. Clarified catalytic cracker fractionator bottoms of 70 SUS viscosity at 210° F. is satisfactory but inferior to front end or a heart cut of aromatic tar from steam cracking of gas oil which are ordinarily preferred as the liquid vehicle for forming the carbon black concentrate.

The petroleum pitch binder or residue which may be advantageously combined with the above-mentioned carbon blacks in order to render them suitable for use as a binder in carbon electrode manufacture include aromatic tar pitch obtained by heat soaking the residuum (600° F.+ bottoms) from steam cracking of gas oil boiling range hydrocarbons including virgin gas oil as well as thermal and catalytic cracker cycle stocks; reduced phenol extracts of lubricating oil or catalytic cycle stocks and preferably vacuum reduced catalytic cracker fractionator bottoms. The latter comprises the materials boiling in the range of about 575 to about 1100° F., with generally not more than 10–15% distilling below 700° F. obtained by high severity catalytic cracking of gas oil. The inspections of typical gas oil feeds, reactor conditions for high severity catalytic cracking and inspections of typical high severity catalytic cracking fractionator bottoms are summarized in Table I.

TABLE I

| Catalytic Cracking Operation | Broad Range | Preferred |
|---|---|---|
| Feed Gas Oil Gravity | 21–25 | 23.5–24 |
| AR (Percent Carbon in Aromatic Rings) | 11–15 | (¹) |
| NR (Percent Carbon in Naphthenic Rings) | 35–39 | (¹) |
| Cat. Cr. Reactor Conditions: | | |
| Temp., °F | 935–955 | 950 |
| Recycle, Percent Fresh Feed | 38–55 | 45–50 |
| Total Conversion, Percent Corr. 430° F | 58–65 | 62 |
| Inspections of Bottoms: | | |
| Gravity, °API | −1.0 to +5.0 | (²) |
| Vis. 210° F., SUS | 60–80 | About 70 |
| Asphaltenes | Trace | Trace |
| ASTM Distillation, °F.: | | |
| I.B.P | 490–510 | 500 |
| 5% | 660–700 | 680 |
| 10% | 720–750 | 730 |
| 20% | 750–790 | 775 |
| 30% | 790–825 | 810 |
| 40% | 815–855 | 840 |
| 50% | 840–880 | 860 |
| 60% | 860–890 | 875 |
| 70% | 890–915 | 905 |
| BMCI | 90–125 | (¹) |

¹ As high as possible.
² As low as possible.

The high severity catalytic cracking fractionator bottoms are vacuum reduced at a maximum still temperature of about 625° F. and at pressures below 100 mm. Hg, preferably at 10–1.7 mm. Hg absolute pressure to a final vapor temperature of 925° F. atmospheric equivalent to produce petroleum pitches having a softening point of about 175 to 250° F. Pitch binders for Soderberg electrode manufacture should have a softening point of about 190–205° F. while for prebaked electrodes softening points of up to 230° F. or higher are preferred. In the case of catalytic fractionator bottoms it is essential to remove catalyst fines as by hot settling or the use of a hydrocyclone apparatus or the like in order that the ash content of the pitch binder may be held below 0.3 wt. percent.

In the manufacture of Soderberg electrodes about 28 to 35 wt. percent of binder based on the green mix is used while in the manufacture of prebaked electrodes about 15 to 25 wt. percent of binder will suffice. In view of the fact that the binder is more expensive than the coke there is a very substantial economic incentive to produce binders which can be used in smaller quantities and still yield green mixes of the necessary working characteristics and baked electrodes or the like of the desired density, compressive strength and electrical characteristics. The following examples are illustrative of the present invention.

*Example 1*

An aromatic tar, obtained as the 725° F.+ bottoms from the distillation of the products from the steam cracking of light virgin gas oil at a coil outlet temperature of about 1200° F. to 1450° F. in the presence of about 60–85 mol percent of steam and immediately quenching to a temperature of about 540–560° F. with an oil having a boiling range of about 500–675° F., was vacuum reduced by flashing at 90 mm. Hg to 1 mm. Hg with a maximum still temperature of 605° F. (to prevent cracking) to a final vapor temperature of 725° F. (atmospheric equivalent). The resultant pitch had the inspections shown under A in Table II below. Another portion of the same aromatic tar after vacuum reduction was mixed with 20 wt. percent of Vulcan 6, an intermediate super abrasion furnace black having a surface area of about 115 sq. meters/gram, and then fluxed with feed aromatic tar to the desired softening point, the final carbon black content being 14 wt. percent. The resultant product had the inspections listed under Sample B in Table II.

TABLE II

|  | Sample A | Sample B |
|---|---|---|
| Softening Point, °F | 182 | 190 |
| Coking Value | 38 | 48 |
| Benzene Insol., Percent | Nil | 14 |
| Quinoline Insol., Percent | Nil | 14 |
| Carbon, Percent | 91.3 | 91.8 |
| Hydrogen, Percent | 6.5 | 5.7 |
| C/H Atomic Ratio | 1.2 | 1.3 |
| Correlation Factor [1] | 46 | 65 |

[1] Coking Value × C/H Atomic Ratio.

Samples A and B were then used to prepare test electrodes by mixing the same with ground delayed petroleum coke that had been calcined at about 2000° F. The ground coke particles (coke aggregate) used for the preparation of the test electrodes were such that 100% passed through a 4-mesh screen and about 30 wt. percent was fine enough to pass through a 200-mesh screen. The binder and coke aggregate were mixed at about 300–325° F. usually in a sigma bladed mixer. The resulting mixture was then molded in the form of test cylinders 1.25 inches in diameter, 4 inches long in graphite molds and baked in an inert atmosphere at temperatures up to a maximum of 1000° C. (1832° F.) for about 23.5 hours under applied pressure to simulate the weight of the green mix above a Soderberg electrode in an actual furnace. The electrode prepared with Sample A as the binder had a compressive strength of 105 kg./cm.$^2$, while that with Sample B as the binder had a compressive strength of 347 kg./cm.$^2$. Since a minimum commercial specification is 385 kg./cm.$^2$ on this scale, Sample A represents a poor or unsatisfactory binder material while Sample B containing carbon black in accordance with the present invention would be rated fair or borderline.

*Example 2*

The fractionator bottoms from the catalytic cracking of a gas oil having a gravity of 23.9° API, 12.5 AR and 35 NR at about 949° F. at a recycle rate of 53% (on fresh feed) to a total conversion of 58.7% corr. 430° F. had an API gravity of 4.2 and a viscosity at 210° F. of 61 SUS. These bottoms were vacuum reduced by flashing at 10–1.7 mm. Hg absolute pressure at a maximum still temperature of 625° F. The vacuum reduced binder pitch product was combined with 1 wt. percent of fluffy Vulcan 6 carbon black by mechanical agitation at 300° F. using a stirrer such as a Brookfield stirrer which gives high shear. The resultant mixture was subjected to heat soaking in an autoclave at 825° F. for ¾ hour to form an electrode binder pitch having a softening point of 188° F., a specific gravity of 1.253, a coking value of 48%, benzene insolubles 21%, quinoline insolubles 4%, carbon 91.5%, C/H ratio 1.4, sulfur 1.8% and a Correlation Factor (coking value × C/H atomic ratio) of 67. Test electrodes were made as per Example 1 with different amounts of this binder. The results obtained are tabulated below.

| Green Mix | | Baked Electrode | |
|---|---|---|---|
| Amount of Binder, Percent | Percent Elongation [1] | Apparent Density, g./cc. | Compressive Strength [2] (kg./cm.$^2$) |
| 32 | 24 | 1.42 | 455 |
| 34 | 50 | 1.38 | 409 |
| 35 | 84 | 1.37 | 373 |

[1] The elongation test is a laboratory measure of paste or green mix fluidity before baking. For this test samples of the green mix are pressed into a cylindrical mold and cooled rapidly. The length of the cylinder of solidified paste is measured whereupon four such samples are placed on an aluminum test plate which is made so that the sliding surface is sloped at an angle of 10° to the horizontal, and the whole is heated in an oven for 15 minutes at 255° C. (491° F.). The samples are then shock chilled and the length of the samples measured and the percent elongation determined. The elongation value desired depends upon the end use; for horizontal stub Soderberg pots, it should be 60–80% and for vertical stub pots 100%. The elongation usually varies more or less directly with the percentage of binder incorporated in the green mix.
[2] The compressive strength is essentially an empirical measure of the suitability of pitch binders for electrode manufacture and on the present scale should be at least about 385 kg./cm.$^2$.

*Example 3*

Fractionator bottoms from the catalytic cracking of a gas oil having a gravity of 23.6° API, 14.1 AR and 37.1 NR at about 952° F. at a recycle rate of 50% (on fresh feed) to a total conversion of 61.2% corr. 430° F. had an API gravity of 1.1 and a viscosity at 210° F. of 74.2 SUS. The bottoms were vacuum reduced as per Example 2. A portion of the vacuum reduced binder pitch was heated to 800° F. maximum in an autoclave for a few minutes. Further portions of the vacuum reduced binder pitch were blended as in Example 2 with 5 wt. percent of pelletized Regal SRF carbon black and 5 wt. percent of fluffy Shawinigan Black CF respectively.

The inspections of the resultant binder pitches were as follows:

|  | Heated VRCC Bttms. | VRCC Bttms. Plus 5% Regal SRF | VRCC Bttms. Plus 5% Shawinigan CF |
|---|---|---|---|
| Quality | Variable | Excellent | Fair |
| Specific Gravity | 1.22–1.23 | 1.22–1.23 | 1.22–1.23 |
| S. Pt., °F | 200 | 210 | 199 |
| Coking Value | 52 | 55.1 | 51.3 |
| Benzene Insol., Percent | 0.6 | 8.5 | 5.7 |
| Quinoline Insol., Percent | Nil | 6.9 | 4.8 |
| Carbon | 92.0 | 92.6 | 91.6 |
| Hydrogen | 6.2 | 5.9 | 5.9 |
| C/H Atomic Ratio | 1.2 | 1.3 | 1.3 |
| Sulfur | 1.8 | 1.8 | 1.6 |
| Correlation Factor | 63 | 72 | 67 |

These binders were used to prepare test electrodes as described above. The results obtained are tabulated below:

| Binder | Green Mix | | Baked Electrode | |
|---|---|---|---|---|
|  | Amt. of Binder | Percent Elong. | Apparent Density, g./cc. | Comp. Strength, kg./cm$^2$. |
| Heated VRCC Bottoms | 25 | 29 | 1.46 | 402 |
|  | 26.5 | 59 | 1.45 | 320 |
|  | 27 | 69 | 1.44 | 298 |
|  | 27.5 | 103 | 1.41 | 273 |
|  | 28 | 220 | 1.43 | 406 |
| VRCC Bottoms Plus 5% Regal SRF | 32 | 240+ | 1.45 | 330 |
|  | 28 | 125 | 1.44 | 370 |
| VRCC Bottoms Plus 5% Shawinigan Black | 30.5 | 149 | 1.42 | 493 |
|  | 28 | 30 | 1.46 | 423 |
|  | 30.5 | 31 | 1.42 | 334 |

The samples prepared with the heated VRCC Bottoms showed a marked bleeding of oil, while those containing the Regal SRF carbon black did not bleed oil. The samples containing the Shawinigan Black showed a trace of bleeding when 30.5% was used as the binder but showed no bleeding when only 28% was used.

*Example 4*

Several additional samples of vacuum reduced catalytic cracker fractionator bottoms obtained from essentially the same feed stocks and under the conditions used in Examples 2 and 3 were prepared and combined with various carbon blacks. The inspections of the electrode binder pitches are tabulated below.

to bleed from the green mix. The binders of the present invention are further characterized by low volatility as compared to coal tar pitch. Low volatility leads to desirable low level of fuming at the anode in commercial aluminum manufacturing operations. This represents a substantial advantage since it leads to a reduction in air polution not only in the plant itself but in large areas surrounding aluminum manufacturing plants. Binder H prepared with Sterling MT a thermal carbon black of 470 mµ average particle size is entirely unsatisfactory because of the severe bleeding of oil from the green mix.

For comparative purposes, the inspections of three coal tar pitches and the properties of test electrodes prepared therefrom are tabulated below.

| | Sample | | | | | |
|---|---|---|---|---|---|---|
| | C | D | E | F | G | H |
| Base Pitch | | | | | | |
| | VRCC Bttms. Heated 900° F. | VRCC Bttms. 191° F. S.P. | VRCC Bttms. 192.5° F. S.P. | VRCC Bttms. 192.5° F. S.P. | VRCC Bttms. 191° F. S.P. | VRCC Bttms. 191° F. S.P. |
| Carbon Black | | | | | | |
| | 5% Pelletized Regal SRF | 5% Fluffy Regal SRF | 2.5% Fluffy Vulcan 6 | 7.5% Fluffy Regal SRF | 5% Fluffy Vulcan 6 | 5% Pelletized Sterling M |
| Quality | | | | | | |
| | Good | Good | Excellent | Excellent | Good | No Good |
| Specific Gravity | | 1.22–1.23 | 1.183 | 1.23 | 1.22–1.23 | 1.21–1.23 |
| Soft. Pt., ° F | 187 | 198 | 198 | 203.5 | 200 | 198 |
| Coking Value | 50 | 51 | 49.2 | 53.5 | 51 | 51.5 |
| Benzene Insol | 5.8 | 6 | 3.6 | 8.5 | 6 | 6.5 |
| Quinoline Insol | 5.3 | 5 | 2.7 | 7.5 | 5 | 5 |
| Carbon | 91.5 | | | | | |
| Hydrogen | 6.0 | | | | | |
| C/H Atomic Ratio | 1.3 | | 2.1 | | | |
| Sulphur | 2.24 | | 60 | | | |
| Correlation Factor | 65 | | 0.23 | | | |
| Ash | | | | | | |

Test electrodes were made with the above binders as per Example 1. The results obtained are tabulated below.

| Binder | Green Mix | | Bleeding | Baked Electrode | |
|---|---|---|---|---|---|
| | Amt. of Binder | Percent Elongation | | Apparent Density, g./cc. | Comp. Strength, kg./cm.² |
| C | 28 | 33 | Slight | 1.42 | 347 |
| C | 30.5 | 61 | do | 1.41 | 380 |
| C | 32 | 53 | No | 1.44 | 369 |
| D | 28 | 22 | No | 1.44 | 404 |
| D | 32 | 62 | Trace | 1.40 | 379 |
| E | 30.5 | ¹71 | No | ¹1.42 | ¹423 |
| E | 32 | ¹95 | No | ¹1.39 | ¹382 |
| F | 32 | 41 | No | 1.43 | 427 |
| F | 34 | 98 | No | 1.39 | 400 |
| G | 34 | 46 | No | 1.37 | 375 |
| H | 28 | 43 | Severe | 1.43 | 358 |
| H | 32 | 300+ | do | 1.40 | 377 |

¹ Average of 2.

All of the binders C, D, E, F and G which are illustrative of the present invention are satisfactory carbon electrode binders since they have no or very little tendency

COAL TAR PITCH INSPECTION

| Sample | 358 | 483 | 219 |
|---|---|---|---|
| Quality | Excellent | Good | Poor |
| Sp. Gravity 60/60° F | 1.310 | 1.269 | |
| Softening Pt., ° F | 203 | 197 | 199 |
| Coking Value | 56.9 | 53.5 | 49.7 |
| Benzene Insol | 32.5 | 28.6 | 25.3 |
| Quinoline Insol | 14.7 | 9.5 | 6.3 |
| Carbon | | 91.8 | |
| Hydrogen | | 4.47 | |
| C/H Atomic ratio | | 1.7 | 1.6 |
| Sulfur | | 0.6 | 0.5 |
| Correlation Factor | 0.4 | 91 | 81 |

| | Green Mix | | Baked Electrodes | |
|---|---|---|---|---|
| | Amt. of Binder, Percent | Elongation, Percent | Apparent Density, g./cc. | Comp. Strength, kg./cm.² |
| Coal Tar Sample 358 | 30.0 | 24 | 1.48 | 428 |
| | 30.5 | 26 | 1.45 | 407 |
| | 31 | 26 | 1.45 | 406 |
| | 32 | 35 | 1.49 | 510 |
| | 35 | 107 | 1.45 | 409 |
| Coal Tar Sample 483 | 30.5 | 26 | 1.42 | 384 |
| | 32.5 | 54 | 1.43 | 452 |
| | 35 | 139 | 1.39 | 346 |
| Coal Tar Sample 219 | 30.5 | 76 | 1.36 | 295 |

As may be seen from the foregoing data, coal tar binders present an anomaly in that the better the coal tar the more that is required to give adequate elongation. Average requirements for the better grades of coal tar are approximately 33-35 wt. percent of binder to provide the desired elongation while 29-32 percent of the petroleum pitch binders containing carbon black in accordance with the present invention provide the desired elongation characteristics in the green mix. This can represent a saving of several hundred dollars per day since in a typical aluminum plant about 150 tons per day of binder costing about $40 per ton are consumed.

Example 5

Green mixes prepared with binders similar to samples C and D of Example 4, i.e. containing 5 wt. percent of Regal SRF carbon black in vacuum reduced cat. fractionator bottoms, were aged at 225° C. for 24 hours and unexpectedly gave a marked increase in the compressive strength and apparent density of the test electrodes. The results obtained were as follows:

EFFECT OF AGING SODERBERG PASTE PREPARED WITH 5 WT. PERCENT REGAL SRF C-BLACK IN VAC. RED. CAT. FRACT. BOTTOMS

|  | Electrode Strength, kg./cm.² | | Apparent Density, g./cc. | |
|---|---|---|---|---|
| Binder Content, wt. percent | 31 | 33 | 31 | 33 |
| Electrode Prepared Directly After Mixing | 300 | 250 | 1.43 | 1.40 |
| Electrode Prepared After Aging Paste 24 Hrs. at 225° C | 355 | 325 | 1.47 | 1.45 |

Example 6

A tank car size sample of electrode pitch binder was prepared as follows:

90 barrels (35,850 pounds) of an aromatic tar distillate (carbon black feed stock) used as the liquid vehicle for forming a carbon black concentrate had the following inspections:

Boiling Range, ° F. (Vapor Temperature) ---- 625–925
Aromatics, percent ---- 95
Sp. Gr. ---- 1.111
ASTM Distillation, ° F.:
    I.B.P. ---- 510
    5% ---- 629
    10% ---- 700
    20% ---- 761
    30% ---- 805
    40% ---- 826
    50% ---- 840
    60% ---- 852
    70% ---- 865
    80% ---- 879
    90% ---- 901
    95% ---- 920

A total of 9000 lbs. of pelletized Regal SRF carbon black was added gradually to the aromatic tar distillate in a grease kettle with stirring and continuous recycle through a Charlotte colloid mill. Mixing was carried out in 4 substantially equal size batches and approximately 7 hours was required for each batch. Colloid mill clearance was 5/1000 inch and the final temperature of the mix was about 140° F.

Specific gravity of the concentrate was 1.160 and the concentrate contained 20 wt. percent carbon black in such a fine degree of dispersion that separation of carbon black did not occur in a centrifuge.

The above concentrate was then metered into the feed to the vacuum distillation unit while running a clarified high severity catalytic cracker fractionator bottoms of substantially the same inspection as the high severity cat. cracker fractionator bottoms of Examples 2 and 3 above. The carbon black concentrate was charged at a rate of 1 to 1.5 wt. percent based on the cat. fractionator bottoms feed to the vacuum distillation unit. The resultant vacuum reduced catalytic cracking bottoms contained 5 wt. percent of carbon black and is good electrode binder pitch material particularly for the manufacture of Soderberg electrodes in view of the fact that it does not bleed from the green material and gives adequate strength and electrical properties to the baked electrodes.

What is claimed is:

1. A binder for the manufacture of shaped carbon articles consisting essentially of a petroleum pitch binder having a softening point of about 175 to 250° F. having dispersed therein from about 1 to about 10 wt. percent, based upon said residuum, of a carbon black having an average particle size of less than 100 millimicrons and a surface area of at least about 15 sq. meters per gram.

2. A composition as defined in claim 1 wherein the petroleum pitch binder is the aromatic tar pitch obtained by heat soaking the residuum from steam cracking of gas oil boiling range hydrocarbons.

3. A composition as defined in claim 1 wherein the petroleum pitch binder is vacuum reduced catalytic cracker fractionator bottoms from a high severity catalytic cracking operation.

4. A binder composition for the manufacture of shaped carbon articles consisting essentially of high severity catalytic cracking fractionator bottoms vacuum reduced to form a petroleum pitch binder having a softening point of about 190–230° F. intimately mixed with about 2 to 8 wt. percent of a "reinforcing" or "semi-reinforcing" carbon black having an average particle size of from about 20 to 80 millimicrons and a surface area of from about 20 to about 250 sq. meters per gram.

5. A method which comprises combining crushed calcined coke particles with a binder consisting essentially of a petroleum pitch binder having a softening point of about 175 to 250° F. having dispersed therein from about 1 to about 10 wt. percent, based upon said residuum, of a carbon black having an average particle size of less than 100 millimicrons and a surface area of at least about 15 sq. meters per gram, shaping and then baking the resultant composition to carbonize said binder and form hard, dense shaped carbon articles.

6. A method which comprises combining crushed calcined coke particles with a binder consisting essentially of high severity catalytic cracking fractionator bottoms vacuum reduced to form a petroleum pitch having a softening point of about 190–230° F. intimately mixed with about 2 to 8 wt. percent of a "reinforcing" or "semi-reinforcing" carbon black having an average particle size of from about 20 to 80 millimicrons and a surface area of from about 20 to about 250 sq. meters per gram, shaping and then baking the resultant composition to carbonize said binder and form hard, dense shaped carbon articles.

7. A method which comprises passing pellets of carbon black having an average particle size of less than 100 millimicrons and a surface area of at least 15 sq. meters per gram through a colloid mill in admixture with an aromatic light distillate boiling in the range of from about 525 to about 900° F. and having a viscosity at 210° F. of about 35–40 SUS and an asphaltene content of at most 5 wt. percent to form a 10 to 25 wt. percent concentrate of finely divided carbon black particle in said aromatic distillate, combining a minor amount of said concentrate in a petroleum pitch binder having boiling range of from about 575 to 1100° F., vacuum flashing the resultant mixture to remove the vaporizable materials therefrom and form a binder pitch having a softening point of about 190–230° F. and containing about 2 to 8 wt. percent of said carbon black combining from about 15 to 35 wt. percent of the carbon black-containing residuum as a binder with from 85 to 65 wt. percent of crushed calcined coke, shaping and then baking the resultant composition to carbonize said binder and form hard, dense, shaped carbon articles.

8. A composition consisting essentially of from about 0 to about 25 wt. percent of finely divided carbon black having an average particle size of less than 100 microns uniformly suspended in from about 90 to 75 wt. percent of an aromatic light distillate boiling in the range of from about 525 to about 900° F. and having a viscosity at 210° F. of about 35–40 SUS and an asphaltene content of a most about 5 wt. percent.

9. The composition as defined in claim 8 wherein the aromatic light distillate is a heart cut of aromatic tar from the steam cracking of gas oil.

References Cited by the Examiner

UNITED STATES PATENTS 2,527,595  10/1950  Swallen et al. ---------- 264—29
2,527,596  10/1950  Shea et al. ---------- 252—502

LEON D. ROSDOL, *Primary Examiner.*

JULIUS GREENWALD, SAMUEL H. BLECH, *Examiners.*

J. D. WELSH, *Assistant Examiner.*